(12) United States Patent
Deevi et al.

(10) Patent No.: US 7,744,846 B2
(45) Date of Patent: Jun. 29, 2010

(54) METHOD FOR FORMING ACTIVATED COPPER OXIDE CATALYSTS

(75) Inventors: Sarojini Deevi, Midlothian, VA (US); Unnikrishnan Pillai, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 579 days.

(21) Appl. No.: 11/370,843

(22) Filed: Mar. 9, 2006

(65) Prior Publication Data

US 2007/0014711 A1 Jan. 18, 2007

Related U.S. Application Data

(60) Provisional application No. 60/660,465, filed on Mar. 11, 2005.

(51) Int. Cl.
C01G 3/02 (2006.01)
B01J 23/72 (2006.01)
(52) U.S. Cl. ................................. 423/604; 502/345
(58) Field of Classification Search ................ 423/604; 502/318, 345
See application file for complete search history.

(56) References Cited

U.S. PATENT DOCUMENTS

| | | | | |
|---|---|---|---|---|
| 3,839,545 | A * | 10/1974 | Schwab | 423/213.2 |
| 4,490,337 | A * | 12/1984 | Richardson | 423/43 |
| 5,143,098 | A | 9/1992 | Rogers et al. | |
| 5,322,075 | A | 6/1994 | Deevi et al. | |
| 5,591,368 | A | 1/1997 | Fleischhauer et al. | |
| 5,934,289 | A | 8/1999 | Watkins et al. | |
| 6,053,176 | A | 4/2000 | Adams et al. | |
| 6,323,347 | B2 * | 11/2001 | Chen et al. | 549/295 |
| 6,769,437 | B2 | 8/2004 | Hajaligol et al. | |
| 6,782,892 | B2 | 8/2004 | Li et al. | |
| 6,857,431 | B2 * | 2/2005 | Deevi et al. | 131/334 |
| 7,004,993 | B2 | 2/2006 | Pithawalla et al. | |
| 7,152,609 | B2 | 12/2006 | Li et al. | |
| 7,165,553 | B2 | 1/2007 | Luan et al. | |
| 7,168,431 | B2 | 1/2007 | Li et al. | |
| 7,228,862 | B2 | 6/2007 | Hajaligol et al. | |
| 7,243,658 | B2 | 7/2007 | Deevi et al. | |
| 2004/0250828 | A1 * | 12/2004 | Luan et al. | 131/364 |
| 2005/0211259 | A1 * | 9/2005 | Gedevanishvili | 131/334 |

OTHER PUBLICATIONS

Richard R. Baker, "*Mechanisms of Smoke Formation and Delivery*," Recent Advances in Tobacco Science, vol. 6, 1980, pp. 184-224.
Richard R. Baker, "*Variation of the Gas Formation Regions within a Cigarette Combustion Coal During the Smoking Cycle*," Beiträge zur Tabakforschung International, vol. 11, No. 1, Mar. 1981, pp. 1-17.
T-J. Huang et al., "*CO Oxidation Behavior of Copper and Copper Oxides*," Catalysis Letters, vol. 87, Nos. 3-4, Apr. 2003, pp. 173-178.
Ren-Xian Zhou et al., "*Oxidation of Carbon Monoxide Catalyzed by Copper-Zirconium Composite Oxides*," Applied Catalysis A: General 162, 1997, pp. 213-222.
Meng-Fei Luo et al., "*TPR and TPD Studies of CuO/CeO$_2$ Catalysts for Low Temperature CO Oxidation*," Applied Catalysis A: General 162, 1997, pp. 121-131.
T-J. Huang et al., "*Effect of support modification on reduction and CO oxidation activity of doped ceria-supported copper oxide catalyst*," Catalysis Letters vol. 85, Nos. 1-2, Jan. 2003, pp. 49-55.
J.A. Rodriguez et al., "*Reduction of CuO in H$_2$: in situ time-resolved XRD studies*," Catalysis Letters vol. 85, Feb. 2003, Nos. 3-4, pp. 247-254.
W. Liu et al., "*Total Oxidation of Carbon Monoxide and Methane over Transition Metal-Fluorite Oxide Composite Catalysts*," J. Catal., 1995, 153, pp. 304-316.
S.H. Taylor et al., "*Copper zinc oxide catalysts for ambient temperature carbon monoxide oxidation*," Chem. Commun., 1999, pp. 1373-1374.
D.M. Whittle et al., "*Co-precipitated copper zinc oxide catalysts for ambient temperature carbon monoxide oxidation: effect of precipitate ageing on catalyst activity*," Phys. Chem. Chem. Phys., 4, 2002, pp. 5915-5920.
Y. Choi et al., "*Kinetics, simulation and insights for CO selective oxidation in fuel cell applications*," J. Power Sources, 2004, 129, pp. 246-254.
M. Haruta, "*Size- and support-dependency in the catalysis of gold*," Catal. Today, 1997, 36, pp. 153-166.

(Continued)

*Primary Examiner*—Stanley Silverman
*Assistant Examiner*—James Fiorito
(74) *Attorney, Agent, or Firm*—Buchanan Ingersoll & Rooney PC

(57) ABSTRACT

A method for forming a copper oxide catalyst includes forming a precipitate of copper hydroxide from a copper salt solution; forming dried particles of copper hydroxide by drying the precipitate at a temperature of less than 30° C.; heating the copper hydroxide particles to form copper oxide; and activating the copper oxide. The copper oxide catalyst includes particles of copper oxide. Copper oxide catalyst particles can preferably include a metastable form of copper oxide. The copper oxide catalyst particles are useful for low-temperature and near-ambient temperature catalysis and/or oxidation of carbon monoxide to carbon dioxide.

18 Claims, 2 Drawing Sheets

OTHER PUBLICATIONS

M. Haruta et al., "*Low-Temperature Oxidation of CO over Gold Supported on $TiO_2$, $\alpha$-$Fe_2O_3$, and $Co_3O_4$*," J. Catal., 1993, 144, pp. 175-192.

A. Wolf et al., "*A systematic study of the synthesis conditions for the preparation of highly active gold catalysts*," Appl. Catal. A: General, 2002, vol. 226, pp. 1-13.

F. Moreau et al., "*The influence of metal loading and pH during preparation on the CO oxidation activity of $Au/TiO_2$ catalysts*," Chem. Commun., 2004, pp. 1642-1643.

B. Qiao et al., "*Highly effective ferric hydroxide supported gold catalyst for selective oxidation of CO in the presence of $H_2$*," Chem. Commun., 2003, pp. 2192-2193.

W. Yan et al., "*Brookite-supported highly stable gold catalytic system for CO oxidation*," Chem. Commun., 2004, pp. 1918-1919.

M. Khoudiakov et al., "*$Au/Fe_2O_3$ nanocatalysts for CO oxidation by a deposition-precipitation technique*," Nanotechnology, 2004, 15, pp. 987-990.

T-J. Huang et al., "*Calcination conditions on copper / alumina catalysts for carbon monoxide oxidation and nitric oxide reduction*," Appl. Catal., 1991, vol. 71, pp. 275-282.

J.T. Kummer, "*Catalysts for Automobile Emission Control*," Prog. Energy Combust. Sci., 1980, vol. 6, pp. 177-199.

B. Skárman et al., "*Morphology and Structure of $CuO_x/CeO_2$ Nanocomposite Catalysts Produced by Inert Gas Condensation: An HREM, EFTEM, XPS, and High-Energy Diffraction Study*," Chem. Mater., 2002, 14, pp. 3686-3699.

B. Skárman et al., *Carbon Monoxide Oxidation on Nanostructured $CuO_x/CeO_2$ Composite Particles Characterized by HREM, XPS, XAS, and High-Energy Diffraction*, J. Catal., 2002, 211, pp. 119-133.

W. Liu at al., "*Transition metal-promoted oxidation catalysis by fluorite oxides: A study of CO oxidation over $Cu$-$CeO_2$*," Chem. Eng. Journal, 1996, 64, pp. 283-294.

A. Tschöpe et al., "*Processing and structural evolution of nanocrystalline $Cu$-$CeO_{2-x}$ catalysts*," Mater. Sci. Eng., 1995, A204, pp. 267-271.

G. Avgouropoulos et al., "*Selective CO oxidation over $CuO$-$CeO_2$ catalysts prepared via the urea-nitrate combustion method*," Appl. Catal. A: General 244, 2003, pp. 155-167.

J.B .Wang et al., "*Synergistic Catalysis of Carbon Monoxide Oxidation over Copper Oxide Supported on Samaria-Doped Ceria*," J. Catal. 208, 2002, pp. 370-380.

Lj. Kundakovic et al., "*Reduction characteristics of copper oxide in cerium and zirconium oxide systems*," Appl. Catal. A: General 171, 1998, pp. 13-29.

R. Bechara et al., "*Preparation and Characterization of Copper-Thorium Oxide Catalysts. 1. Solid Solution of Copper (II) in Thoria: An ESR Study*," Chem. Mater., 1990, 2, pp. 518-522.

X-y. Jiang et al., "*Effect of the addition of $La_2O_3$ on TPR and TPD of $CuO$ / $\gamma$-$Al_2O_3$ catalysts*," Appl. Catal. A. General 150, 1997, pp. 131-141.

G.G. Jernigan et al., "*Carbon Monoxide Oxidation over Three Different Oxidation States of Copper: Metallic Copper, Copper (I) Oxide, and Copper (II) Oxide-A Surface Science and Kinetic Study*," J. Catal., 1994, 147, pp. 567-577.

V.A. Sadykov et al., Letter to the Editor Comment on "*Carbon Monoxide Oxidation over Three Different Oxidation States of Copper: Metallic Copper, Copper (I) Oxide, and Copper (II) Oxide-A Surface Science and Kinetic Study*," J. Catal., 1997, 165, pp. 279-283.

M. O'Keeffe et al., "*Thermodynamics of the Formation and Migration of Defects in Cuprous Oxide*," Chem. Phys., Jun. 1, 1962, vol. 36, No. 11, pp. 3009-3013.

K. Nagase et al., "*Dynamic Study of the Oxidation State of Copper in the Course of Carbon Monoxide Oxidation over Powdered CuO and $Cu_2O$*" J. Catal., 1999, 187, pp. 123-130.

E.D. Pierron et al., "*Copper Oxide on Alumina I. XRD Studies of Catalyst Composition during Air Oxidation of Carbon Monoxide*," J. Catal., 1967, 9, pp. 38-44.

G.I. Golodets, "*Heterogeneous Catalytic Reactions Involving Molecular Oxygen*," Elsevier, Amsterdam, 1983, pp. 280-311.

Y. Cudennec et al., "*The transformation of $Cu(OH)_2$ into CuO, revisited*," Solid State Sciences 5, 2003, pp. 1471-1474.

J.R. Günter et al., "*Topotactic Electron Induced and Thermal Decomposition of Copper(II) Hydroxide*," J. Appl. Cryst., 1970, 3, pp. 21-26.

Commonly Owned Applications in Connection with U.S. Appl. No. 11/370,843 U.S. Appl. No. 10/460,617, Preparation of Intermetallics by Metallo-Organic Decomposition, Filed Jun. 13, 2003.

U.S. Appl. No. 10/460,631, Catalyst to Reduce Carbon Monoxide in the Mainstream Smoke of a Cigarette, Filed Jun. 13, 2003.

U.S. Appl. No. 10/460,302, Oxidant/Catalyst Nanoparticles to Reduce Tobacco Smoke Constituents Such as Carbon Monoxide, Filed Jun. 13, 2003.

U.S. Appl. No. 10/972,209, In Situ Synthesis of Composite Nanoscale Particles, Filed Oct. 25, 2004.

U.S. Appl. No. 10/972,201, Tobacco Cut Filler Including Metal Oxide Supported Particles, Filed Oct. 25, 2004.

U.S. Appl. No. 10/972,202, Preparation of Mixed Metal Oxide Catalysts From Nanoscale Particles, Filed Oct. 25, 2004.

U.S. Appl. No. 10/972,203, Cigarettes and Cigarette Components Containing Nanostructured Fibril Materials, Filed Oct. 25, 2004.

U.S. Appl. No. 10/866,181, Cigarette Wrapper with Catalytic Filler and Methods of Making Same, Filed Jun. 14, 2004.

U.S. Appl. No. 10/870,449, Shredded Paper with Catalytic Filler in Tobacco Cut Filler and Methods of Making Same, Filed Jun. 14, 2004.

U.S. Appl. No. 10/972,206, Reduction of Carbon Monoxide in Smoking Articles Using Transition Metal Oxide Clusters, Filed Oct. 25, 2004.

U.S. Appl. No. 10/868,015, Silver and Silver Oxide Catalysts for the Oxidation of Carbon Monoxide in Cigarette Smoke, Filed Jun. 16, 2004.

U.S. Appl. No. 10/972,208, Reduction of Carbon Monoxide and Nitric Oxide in Smoking Articles Using Nanoscale Particles and/or Clusters of Nitrided Transition Metal Oxides, Filed Oct. 25, 2004.

U.S. Appl. No. 11/252,773, Palladium-Containing Nanoscale Catalysts, Filed Oct. 19, 2005.

U.S. Appl. No. 10/972,207, Use of Oxyhydroxide Compounds in Cigarette Paper for Reducing Carbon, Filed Oct. 25, 2004.

U.S. Appl. No. 10/972,295, Cigarette Wrapper with Nanoparticle Spinel Ferrite Catalyst and Methods of Making Same, Filed Oct. 25, 2004.

U.S. Appl. No. 10/972,204, In Situ Synthesis of Composite Nanoscale Particles, Filed Oct. 25, 2004.

U.S. Appl. No. 11/653,856, Cigarette Components Having Encapsulated Catalyst Particles and Methods of Making and Use Thereof, Filed Jan. 17, 2007.

U.S. Appl. No. 11/636,589, Supported Catalysts, Filed Dec. 11, 2006.

U.S. Appl. No. 11/729,951, In Situ Formation of Catalytic Cigarette Paper, Filed Mar. 30, 2007.

U.S. Appl. No. 11/698,192, Catalysts to Reduce Carbon Monoxide Such As in the Mainstream Smoke of a Cigarette, Filed Jan. 26, 2007.

U.S. Appl. No. 10/950,663, Nanocomposite Copper-Ceria Catalysts for Low Temperature or Near-Ambient Temperature Catalysis and Methods for Making Such Catalysts, Filed Sep. 28, 2004.

U.S. Appl. No. 11/252,849, Gold-Ceria Catalyst for Oxidation of Carbon Monoxide, Filed Oct. 19, 2005.

U.S. Appl. No. 10/972,205, Formation and Deposition of Sputtered Nanoscale Particles in Cigarette Manufacture, Filed Oct. 25, 2004.

U.S. Appl. No. 11/452,995, Gold-Ceria Catalyst for Oxidation of Carbon Monoxide, filed Jun. 15, 2006.

U.S. Appl. No. 11/371,021, Catalysts for Low Temperature Oxidation of Carbon Monoxide, Filed Mar. 9, 2006.

U.S. Appl. No. 11/641,003, Corrugated Catalytic Cigarette Paper and Cigarettes Comprising the Same, Filed Dec. 19, 2006.

U.S. Appl. No. 11/077,554, Methods for Forming Transition Metal Oxide Clusters and Smoking Articles Comprising Transition Metal Oxide Clusters, Filed Mar. 11, 2005.

U.S. Appl. No. 10/560,396, Cigarette Wrapper with Printed Catalyst, Filed Nov. 2, 2006.

\* cited by examiner

METHOD FOR FORMING ACTIVATED COPPER OXIDE CATALYSTS

CROSS-REFERENCE TO RELATED APPLICATION

This application claims priority under 35 U.S.C. §119 to U.S. Provisional Application No. 60/660,465 entitled METHOD FOR FORMING ACTIVATED COPPER OXIDE CATALYSTS, filed Mar. 11, 2005, the entire content of which is hereby incorporated by reference.

BACKGROUND

Cigarettes produce both mainstream smoke during a puff and sidestream smoke during static burning. Constituents of both mainstream smoke and sidestream smoke are carbon monoxide (CO) and nitric oxide (NO). The reduction of carbon monoxide and/or nitric oxide in smoke is desirable.

SUMMARY

Disclosed is a method of forming particles of a copper oxide catalyst as well as the catalyst particles produced by the method. The method comprises (i) forming a precipitate of copper hydroxide from a copper salt solution; (ii) drying the copper hydroxide precipitate at a temperature of less than about 30° C.; (iii) heating the copper hydroxide particles to form copper oxide; and (iv) activating the copper oxide.

The copper hydroxide can be precipitated from a solution comprising a copper salt (e.g., copper nitrate) by adjusting the pH of the solution. For example, ammonia can be added drop-wise to copper salt solution to form particles of a copper hydroxide precipitate. According to a preferred embodiment, the copper hydroxide precipitate is formed by adjusting the pH of the solution to between about 6 and 9.

After drying the copper hydroxide (e.g., in air), copper oxide can be formed by heating the copper hydroxide particles in an oxidizing atmosphere at a temperature of between about 200° C. and 350° C. For example, the copper hydroxide particles can be heated in air at a temperature of between about 200° C. and 350° C., preferably about 250° C., for at least about 2 hours.

According to a preferred embodiment, the copper oxide is activated by heating the copper oxide in an atmosphere comprising oxygen and carbon monoxide at a temperature of about 100° C. A preferred atmosphere for activating the copper oxide comprises 15 to 25% oxygen, 2 to 5% carbon monoxide (balance argon).

The copper oxide catalyst particles, which can comprise a metastable form of copper oxide, can oxidize carbon monoxide to carbon dioxide at room temperature. The copper oxide catalyst particles, which can comprise nanoscale particles, preferably comprise cupric oxide (CuO).

The copper oxide catalyst particles can be incorporated into a cigarette. The copper oxide catalyst can be incorporated in at least one component of the cigarette selected from the group consisting of a tobacco rod, cigarette paper and a cigarette filter. Preferably the cigarette comprises an amount and/or distribution of the copper oxide catalyst particles effective to reduce the concentration in mainstream smoke of carbon monoxide during smoking of the cigarette.

Also disclosed is a method of oxidizing carbon monoxide to carbon dioxide comprising contacting a copper oxide catalyst with a gas containing carbon monoxide, the gas being selected from the group consisting of a vehicle exhaust emission, a gas used in a laser, a gas used in a fuel cell and ambient air undergoing air filtration.

DETAILED DESCRIPTION OF PREFERRED EMBODIMENTS

Figure 1:
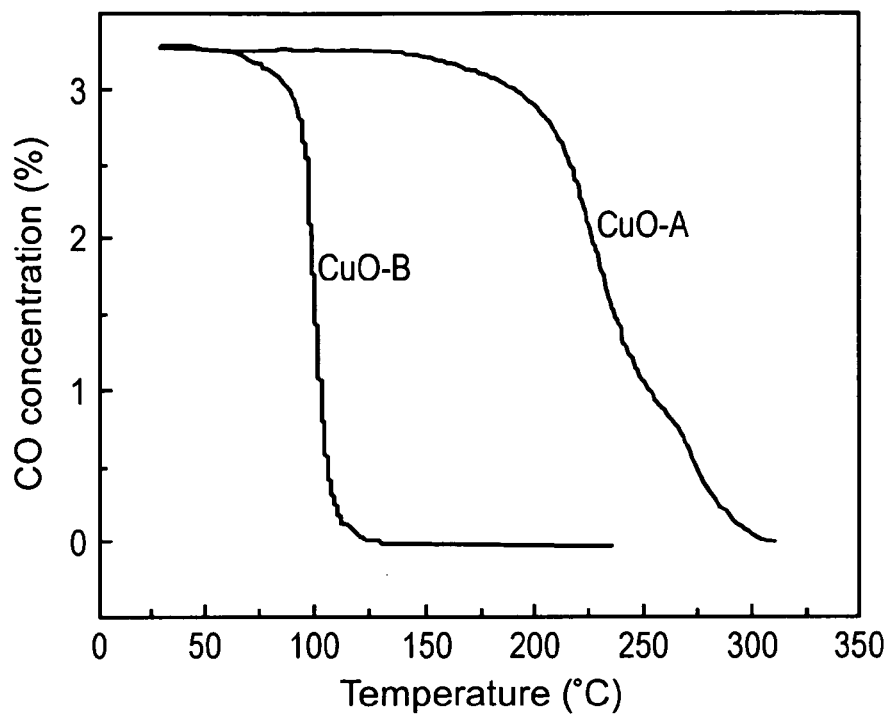
FIG. 1 shows a plot of carbon monoxide concentration versus temperature for unactivated copper oxide catalyst particles and comparative, commercially available copper oxide material.

Disclosed is a method of making catalyst particles comprising copper oxide as well as copper oxide catalyst particles made by the method. The catalyst particles are useful for low-temperature or near-ambient temperature oxidation of carbon monoxide. By "low temperature" is meant temperatures below about 200° C. By "near-ambient" is meant temperatures from about 20° C. to about 40° C. All percentages disclosed herein are percentages by weight, unless disclosed otherwise. The catalyst particles, which may comprise a metastable form of copper oxide, can be incorporated into a component of a cigarette (e.g., tobacco cut filler, cigarette paper and/or cigarette filter material). The catalyst particles can also be used to reduce the concentration of carbon monoxide from a vehicle exhaust emission, a gas used in a laser, a gas used in a fuel cell and/or ambient air undergoing air filtration.

The catalyst particles comprise crystalline copper oxide (e.g., CuO) and a metastable, non-stoichiometric copper oxide moiety that is formed by activating copper oxide particles that are formed by calcining precipitated copper hydroxide.

A method for forming the copper oxide catalyst particles comprises (i) forming a precipitate of copper hydroxide from a copper salt solution; (ii) optionally filtering the precipitate; (iii) forming dried particles of copper hydroxide by drying the precipitate at a temperature of less than about 30° C.; (iv) heating the copper hydroxide particles to form copper oxide; and (v) activating the copper oxide.

Preferably, copper hydroxide is formed by increasing the pH of a copper salt solution (e.g., an aqueous solution of a copper salt) in an amount effective to precipitate particles of copper hydroxide. Exemplary copper salts suitable for forming a copper salt solution include copper nitrate, copper chloride, copper acetate, copper sulfate as well as the hydrates thereof. Preferably, the copper salt solution comprises an aqueous solution of copper nitrate.

A solution of ammonia, sodium hydroxide or other alkali compound can be used to increase the pH of the copper salt solution. In a preferred embodiment, an aqueous solution of an alkali compound is added drop-wise to an aqueous solution of a copper salt until the pH of the solution is between about 6 and 9, preferably between about 7 and 8.

Optionally, the precipitated copper hydroxide can be filtered and washed prior to drying. Thereafter, the precipitated copper hydroxide can be dried at near ambient temperature, preferably at room temperature for 24 to 48 hours.

Copper oxide particles can be formed by heating (calcining) the dried copper hydroxide at a temperature of from about 200° to 350° C. in an oxidizing atmosphere. Thereafter, the copper oxide particles can be activated. Activation comprises heating the copper oxide particles at a temperature of about 100° C. in a gas mixture comprising carbon monoxide and oxygen and then cooling the activated copper oxide particles to room temperature. A preferred gas mixture for the activation comprises about 4% CO, 21% oxygen (balance argon).

The activated copper oxide catalyst particles preferably have low aspect ratio shapes such as spheres or spheroids. The particles of the catalyst may have an aspect ratio of about 1 (e.g., spheres) or greater than 1 (e.g., spheroids) where aspect ratio is defined as the ratio of length to diameter of the particle.

The activated copper oxide catalyst particles can comprise nanoscale particles. By "nanoscale" is meant that the particles have an average particle diameter of less than about 100 nm (e.g., less than about 50 nm, more preferably less than about 10 nm).

As used herein, a catalyst is capable of affecting the rate of a chemical reaction, e.g., a catalyst can increase the rate of oxidation of carbon monoxide to carbon dioxide without participating as a reactant or product of the reaction. An oxidant is capable of oxidizing a reactant, e.g., by donating oxygen to the reactant, such that the oxidant itself is reduced. A reducing agent is capable of reducing a reactant, e.g., by receiving oxygen from the reactant, such that the reducing agent itself is oxidized.

According to an embodiment, the activated copper oxide catalyst particles can be incorporated into one or more components of a cigarette in an amount effective to convert carbon monoxide to carbon dioxide during smoking of the cigarette. While not wishing to be bound by theory, it is believed that during smoking of a cigarette having incorporated therein copper oxide catalyst particles, CO can be oxidized in the presence of oxygen to reduce the level of CO in mainstream and/or sidestream smoke.

The amount of the copper oxide catalyst incorporated into a cigarette can be selected such that the amount of carbon monoxide in mainstream smoke is reduced during smoking of a cigarette. For example, the total amount of the catalyst per cigarette can be from about 1 to 200 mg, 1 to 50 mg, or 50 to 100 mg. Preferably, the total amount of catalyst per cigarette is an amount effective to convert at least some CO to $CO_2$. Preferably, the copper oxide catalyst particles are incorporated in tobacco cut filler, cigarette wrapper and/or a cigarette filter in an amount effective to reduce the concentration in mainstream smoke of carbon monoxide and/or nitric oxide by at least 5% (e.g., by at least 15%, 20%, 25%, 30%, 35%, 40%, 45%, 50%, 55%, 60%, 65%, 70%, 75%, 80%, 85%, 90% or 95%).

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing smoke from the combustion through the mouth end of the cigarette. The cigarette may also be smoked by other means. For example, the cigarette may be smoked by heating the cigarette and/or heating using electrical heater means as described in commonly-assigned U.S. Pat. Nos. 6,053,176; 5,934,289; 5,591,368 or 5,322,075 the contents of which are hereby incorporated by reference in their entirety.

The term "mainstream" smoke refers to the mixture of gases passing down the tobacco rod and issuing through the filter end, i.e., the smoke issuing or drawn from the mouth end of a cigarette during smoking of the cigarette. The mainstream smoke contains smoke that is drawn in through both the lighted region, as well as through the cigarette wrapper. The term "sidestream" smoke refers to smoke produced during static burning.

Several factors contribute to the formation of carbon monoxide in a cigarette. In addition to the constituents in the tobacco, the temperature and the oxygen concentration in a cigarette during combustion can affect CO formation. For example, the total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$, are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the copper oxide catalyst particles can target the various reactions that occur in different regions of the cigarette during smoking. The copper oxide catalyst particles can convert CO to $CO_2$ in the presence of an external source of oxygen.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. The concentration of oxygen is low in the combustion zone because oxygen is being consumed in the combustion of tobacco to produce carbon monoxide, carbon dioxide, nitric oxide, water vapor and other organic compounds. The low oxygen concentration coupled with the high temperature leads to the reduction of carbon dioxide to carbon monoxide by the carbonized tobacco. In the combustion zone, the copper oxide catalyst particles can promote oxidation of carbon monoxide to carbon dioxide as there is some oxygen present. The combustion zone is highly exothermic and the heat generated is carried to the pyrolysis/distillation zone.

The pyrolysis zone is the region behind the combustion zone, where the temperature ranges from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, nitric oxide, carbon and other smoke components using the heat generated in the combustion zone. There is some oxygen present in this region, and thus the copper oxide catalyst particles may promote oxidation of carbon monoxide to carbon dioxide.

In the condensation/filtration zone the temperature ranges from ambient to about 60° C. The major process in this zone is the condensation/filtration of the smoke components. Some amount of carbon monoxide and carbon dioxide diffuse out of the cigarette and some oxygen (e.g., air) diffuses into the cigarette. The partial pressure of oxygen in the condensation/filtration zone does not generally recover to the atmospheric level. In the condensation/filtration zone, the copper oxide catalyst particles can promote oxidation of carbon monoxide to carbon dioxide in the presence of oxygen.

During the smoking of a cigarette, the mainstream smoke flows toward the filter end of the cigarette. As carbon monoxide travels within the cigarette, oxygen diffuses into and carbon monoxide diffuses out of the cigarette through the wrapper. After a typical 2-second puff of a cigarette, CO is concentrated in the periphery of the cigarette, i.e., near the cigarette wrapper, in front of the combustion zone. Due to diffusion of $O_2$ into the cigarette, the oxygen concentration is also high in the peripheral region. Airflow into the tobacco rod is largest near the combustion zone at the periphery of the smoking article and is approximately commensurate with the gradient of temperature, i.e., higher airflow is associated with larger temperature gradients. In a typical cigarette, the highest temperature gradient is from the combustion zone (>850-900° C.) axially toward the filter end of the cigarette. Within a few millimeters behind the combustion zone the temperature drops to near ambient. Further information on airflow patterns, the formation of constituents in cigarettes during smoking and smoke formation and delivery can be found in Richard R. Baker, "Mechanism of Smoke Formation and Delivery", Recent Advances in Tobacco Science, vol. 6, pp. 184-224, (1980) and Richard R. Baker, "Variation of the Gas Formation Regions within a Cigarette Combustion Coal during the Smoking Cycle", Beiträge zur Tabakforschung International, vol. 11, no. 1, pp. 1-17, (1981), the contents of both are incorporated herein by reference.

The copper oxide catalyst particles may be placed in the tobacco cut filler, the cigarette filter, or incorporated in cigarette paper. The copper oxide catalyst particles can be placed both in the tobacco cut filler and in other locations. The quantity, location and distribution in a cigarette of the catalyst particles can be selected as a function of the temperature and airflow characteristics exhibited during smoking in order to adjust, e.g., increase or maximize the conversion rate of CO to $CO_2$.

Once formed, the copper oxide catalyst particles may be incorporated into at least one component in the form of a dry powder, paste or dispersion in a liquid. For example, catalyst particles in the form of a dry powder can be dusted on cut filler, cigarette paper material or filter material. A dispersion of the catalyst particles can be sprayed on the cut filler, cigarette paper material or filter material.

The copper oxide catalyst particles may be incorporated into the tobacco rod of a cigarette. The catalyst particles may be provided continuously along the length of a tobacco rod or at discrete locations along the length of a tobacco rod. Furthermore, the catalyst particles may be homogeneously or non-homogeneously distributed along the length of a tobacco rod. The catalyst particles may be added to cut filler tobacco stock (e.g., loose cut filler) supplied to a cigarette-making machine or incorporated directly on a tobacco rod prior to wrapping a cigarette wrapper around the cigarette rod to form a tobacco column.

Any suitable tobacco mixture may be used for the cut filler. Examples of suitable types of tobacco materials include flue-cured, Burley, Bright, Maryland or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

In addition to or in lieu of incorporating the copper oxide catalyst particles in the tobacco rod, the copper oxide catalyst particles may be incorporated in cigarette paper before or after the cigarette paper is incorporated into a cigarette. The catalyst particles may be incorporated into the cellulosic web of the paper by depositing the catalyst particles directly on the cellulosic web and/or combined with web-filler material that is incorporated in the paper.

The copper oxide catalyst particles can be incorporated in cigarette paper by spraying or coating the particles onto a wet base (e.g., cellulosic) web, an intermediate web or a finished web. For example, a dried copper oxide powder can be physically admixed with the cigarette paper material during the paper manufacturing process. The copper oxide catalyst particles can be coated and/or printed on at least one surface of a paper wrapper (e.g., an interior and/or exterior surface) to form text or images on the cigarette wrapper.

The copper oxide catalyst particles can be incorporated into cigarette wrapping paper by incorporating the catalyst particles directly into the paper web and/or by incorporating the catalyst particles in web-filler material used in the production of the wrapping paper. The web-filler material can include an oxide, a carbonate, or a hydroxide of a Group II, Group III or Group IV metal, or the web-filler material can be selected from the group consisting of $CaCO_3$, $TiO_2$, $SiO_2$, $Al_2O_3$, $MgCO_3$, MgO and $Mg(OH)_2$.

In practice, the web-filler material serves as an agent for controlling the permeability of the wrapper (measured typically in units of Coresta, which is defined as the volume of air, measured in cubic centimeters, that passes through one square centimeter of material in one minute at a pressure drop of 1.0 kilopascals) and also can serve as a support for the catalyst particles.

A catalyst-modified web-filler comprises copper oxide catalyst particles incorporated in and/or on particles of web-filler. In a preferred example, the web-filler material is $CaCO_3$ or other conventional filler material used in cigarette wrapper manufacture such as ALBACAR® 5970, which is calcium carbonate commercially available from Specialty Minerals of Bethlehem, Pa.

Aqueous slurry of the copper oxide catalyst particles and the web-filler material can be incorporated into the head box of a paper-making machine and the mixture of catalyst particles and web filler material can be incorporated into cigarette paper during the paper-making process.

The copper oxide catalyst particles and filler can be provided in any desired ratio, e.g., 10 to 90 wt. % catalyst and 90 to 10 wt. % web-filler material. In a preferred embodiment, the amount of web-filler material in the wrapper (both catalyst-modified web-filler and/or web-filler material without catalyst) can be from 3 to 50 wt. %.

A catalyst-modified web-filler can be used as all or part of the filler material in the wrapper-making processes or can be distributed directly onto the wrapper, such as by spraying or coating onto wet or dry base web. In production of a cigarette, the wrapper is wrapped around cut filler to form a tobacco rod portion of the smoking article by a cigarette-making machine, which has previously been supplied or is continuously supplied with tobacco cut filler and one or more ribbons of wrapper.

Copper oxide catalyst particles can be incorporated in the wrapper of a cigarette wherein the wrapper comprises a first wrapper and a second outermost wrapper. Preferably, the copper oxide catalyst particles are incorporated in the first inner wrapper. The total amount of catalyst in the second outer wrapper is preferably less than 50 mg for a given single cigarette, more preferably the second outer wrapper does not include the catalyst particles so as to provide a cigarette whose appearance is not affected by coloration from the catalyst particles.

A cigarette wrapper can be any wrapping suitable for surrounding the cut filler, including wrappers containing flax, hemp, kenaf, esparto grass, rice straw, cellulose and so forth. Optional filler materials, flavor additives, and burning additives can be included in the cigarette wrapper. The wrapper can have more than one layer in cross-section, such as in a bi-layer wrapper as disclosed in commonly-owned U.S. Pat. No. 5,143,098, the entire content of which is herein incorporated by reference.

The copper oxide catalyst particles are capable of converting CO to $CO_2$ at low temperatures, and therefore can be incorporated in the filter element of a cigarette. The filter element may comprise a mono filter, a dual filter, a triple filter, a single- or multiple-cavity filter, a recessed filter or a free-flow filter. The copper oxide catalyst particles can be incorporated into one or more filter parts selected from the group consisting of a shaped wrapper insert, a plug, a space between plugs, cigarette filter wrapper, plug wrap, a cellulose acetate sleeve, a polypropylene sleeve, and a free-flow sleeve. Optionally, the filter can further comprise additives such as flavorants or adsorbents.

Copper oxide catalyst particles will preferably be distributed throughout the tobacco rod, cigarette filter material and/or the cigarette wrapper portions of a cigarette. By providing the catalyst throughout one or more components of a cigarette it is possible to reduce the amount of carbon monoxide drawn through the cigarette, particularly at the combustion, pyrolysis, condensation and/or filter regions.

Techniques for cigarette manufacture are known in the art. Any conventional or modified cigarette making technique may be used to incorporate the copper oxide catalyst particles. The cut filler composition is optionally combined with other cigarette additives, and provided to a cigarette-making machine to produce a tobacco column, which is then wrapped in a cigarette wrapper, and optionally tipped with filters. The resulting cigarettes can be manufactured to any known specifications using standard or modified cigarette making techniques and equipment.

Cigarettes may range from about 50 mm to about 120 mm in length. The circumference is from about 15 mm to about 30 mm, preferably about 25 mm. The tobacco packing density is typically between the range of about 100 mg/cm$^3$ to about 300 mg/cm$^3$, and preferably 150 mg/cm$^3$ to about 275 mg/cm$^3$.

Aspects of forming copper oxide catalyst particles are disclosed below. Activated copper oxide catalyst particles can be prepared by precipitating copper hydroxide from a suitable copper salt, filtering and drying the copper hydroxide, calcining the copper hydroxide to form particles of copper oxide, and activating the copper oxide particles. For example, copper hydroxide was precipitated from a mixture comprising a 0.5 M aqueous solution of copper nitrate dihydrate ($Cu(NO_3)_2 \cdot 2H_2O$) and a 15% aqueous solution of ammonia. The ammonia solution was added dropwise to the copper nitrate solution in an amount sufficient to bring the pH of the mixture to about 7.5. The precipitated copper hydroxide was filtered (e.g., vacuum filtered), washed, and then dried in air at near ambient temperature for 48 hours. Copper oxide particles were formed by heating (calcining) the dried, precipitated copper hydroxide at 10° C./min. to 250° C. in air for 2 hrs. and then cooling the copper oxide particles to room temperature. Finally, the copper oxide particles were activated. Activation comprises heating the copper oxide particles to a temperature of 100° C. in a gas mixture comprising 3.6% CO and 21% $O_2$ (balance argon) (1000 ml/min.) and then cooling the copper oxide particles to room temperature in flowing argon (250 ml/min.) to form the activated copper oxide catalyst particles.

The properties, including the catalytic efficiency, of the activated copper oxide particles can be evaluated against various comparative examples. A first comparative example comprises unactivated copper oxide particles otherwise prepared as disclosed above.

A second comparative example comprises commercially available copper oxide (CuO) particles (Alfa Aesar). The commercially available copper oxide can be heated in air at 250° C. for 2 hrs. (i.e., calcined) prior to evaluating its catalytic efficiency. X-ray diffraction data, which was obtained using a Philips X'pert x-ray diffractometer (Cu $K_\alpha$ radiation) operated at 45 kV and 40 mA, was acquired for the commercially available copper oxide particles and the activated copper oxide catalyst particles. Diffraction patterns from both samples index to monoclinic copper oxide (CuO); however, the peaks for the activated copper oxide material are less intense and broader than the peaks for the commercial copper oxide, which suggests a more highly defined crystalline state for the latter.

Third and fourth comparative samples can be prepared by drying precipitated copper hydroxide (prepared as above) at a temperature above ambient temperature (e.g., 110° C. for 12 hours) prior to calcining the copper hydroxide (in air at 10° C./min to 250° C. for 2 hrs.) and optionally activating the resulting copper oxide. Thus, a third comparative sample comprises activated copper oxide, and a fourth comparative example comprises unactivated copper oxide, wherein the third and fourth comparative examples are derived from copper hydroxide that was dried at an elevated temperature prior to calcining.

Temperature programmed reduction (TPR) and x-ray photoelectron spectroscopy (XPS) were used to evaluate the properties of the copper oxide catalyst particles. Temperature programmed reduction was carried out using a gas mixture of 7% $H_2$ (balance argon) in a Micromeritics Adsorption Unit (Model Autochem 2920). XPS analysis was conducted using a Physical Electronics x-ray photoelectron spectrometer (Model 5700LSci) operated using an Al $K_\alpha$ x-ray source with a pass energy of 50 eV.

The TPR results show that the activated copper oxide catalyst material (i.e., copper oxide catalyst particles derived from copper hydroxide that had been dried in air at near ambient temperature) has reduction behavior that is more similar to the reduction behavior of copper hydroxide than to the reduction behavior of commercially available copper oxide. This suggests that the state of the copper in the activated copper oxide catalyst is similar to the state of the copper in copper hydroxide.

XPS analysis of the activated copper oxide catalyst and the commercially available copper oxide were performed on samples after activation. The XPS results show similar Cu $2p_{3/2}$ peaks; however, the O 1s peak for the activated copper oxide catalyst comprises a shoulder peak at 531 eV, which corresponds to a —C=O group. Without wishing to be bound by theory, it is believed that the activated copper oxide catalyst comprises surface-adsorbed CO, which suggests that the activated copper oxide catalyst comprises catalytically active copper sites that are not present in commercially available copper oxide.

Specifically, it is believed that the activated copper oxide catalyst comprises a non-stoichiometric copper oxide. This result is corroborated by heat flow measurements, which were obtained using a TA Instruments differential scanning calorimetry (DSC)/thermo gravimetric analysis (TGA) apparatus (Model SDT 2960). A gas flow of 3.6% CO and 21% $O_2$ (balance argon) was used to obtain the DSC data. Heat flow studies over the activated copper oxide catalyst reveal exotherms not observed for commercial copper oxide.

According to one model, the oxidation of CO over metal oxides (e.g., copper oxide) can follow a nucleophilic interfacial Mars-van Krevelen oxidation mechanism, which comprises the transfer of oxygen from the metal oxide lattice across the solid-gas interface and the concomitant filling of the resulting lattice oxygen vacancy. The enhanced capacity for the activated copper oxide catalyst to oxidize CO (i.e., at room temperature) can be attributed to the presence in the activated copper oxide catalyst of a non-stoichiometric copper oxide species that is an efficient conduit for lattice oxygen. The room temperature catalytic activity of the activated copper oxide catalyst is decreased if the activated copper oxide catalyst is exposed to open air.

Non-stoichiometric, metastable copper oxide species can be formed from precipitated copper hydroxide that is dried at near-ambient temperature, calcined and activated, but not from precipitated copper hydroxide that is dried at an elevated temperature. By drying the precipitated $Cu(OH)_2$ at near-ambient temperature, reversible square planar arrays of $Cu(OH)_4$ can form via Jahn-Teller distortions. These structures can be stabilized by a network of hydrogen bonds and can promote—during activation—the formation of non-stoichiometric copper oxide species (e.g., $CuO_x$). Drying the precipitated $Cu(OH)_2$ at an elevated temperature, however, can promote dehydration via an oxolation mechanism and the formation of O—Cu—O bridges between $Cu(OH)_2$ layers. During calcination, highly crystalline copper oxide phases can form, which are reduced to stoichiometric copper oxide or metallic copper during activation.

The activity of selected copper oxide catalysts was evaluated using a continuous flow packed bed reactor. The reactor comprises an 8 mm inner diameter quartz tube positioned within a programmable tube furnace (Thermolyne Model 48000). A test sample (100 mg) comprising particles of copper oxide catalyst can be placed between two beds of glass wool inside the quartz tube. Thermocouples can be used to monitor the temperature of the furnace and of the catalyst bed within the quartz tube. A filter pad can prevent particulates from entering a gas analyzer, which is located at a downstream side of the quartz tube. An input reactant gas mixture is introduced at an upstream side of the quartz tube and is passed through the quartz tube and over the catalyst particles at approximately atmospheric pressure at a total gas flow rate of about 1000 ml/min. An input reactant gas mixture was used to optionally activate the copper oxide catalyst particles and to measure the oxidation of CO in the presence of an external source of oxygen. The input reactant gas mixture consists essentially of about 3.6% CO and 21% $O_2$ (balance argon).

After attaining a steady state flow of gas, the temperature of the furnace can be increased at a heating rate of about 10° C./min. Alternatively, the catalytic efficiency of the copper oxide catalyst can be evaluated at near ambient temperature by not increasing the temperature of the furnace. During room temperature measurements, where exothermic oxidation of CO to $CO_2$ can increase the temperature of the copper oxide catalyst, air can be flowed over the external surface of the quartz tube to maintain the temperature of the catalyst below about 30° C.

The gas that passes over the catalyst particles and emerges from the downstream side of the quartz tube can be analyzed by an NLT2000 multi-gas analyzer (Rosemount Analytical, Orville, Ohio) with a data acquisition system that can measure the concentration of CO, $CO_2$ and $O_2$ in the gas.

Data from the multi-gas analyzer can be plotted as a function of furnace temperature. From the plotted data can be obtained the temperature at which about 5% of the carbon monoxide is converted to carbon dioxide ($T_5$), the temperature at which about 50% of the carbon monoxide is converted to carbon dioxide ($T_{50}$) and the temperature corresponding to full conversion ($T_{100}$).

FIG. 1 shows CO oxidation curves (i.e., CO concentration as a function of temperature) for commercially available copper oxide (curve A) and copper oxide particles prepared from calcined copper hydroxide (curve B). The copper hydroxide particles were formed via precipitation and dried in air at near ambient temperature prior to calcining (in air) at 250° C. for 2 hrs. Neither sample was activated prior to testing. Referring to FIG. 1, no oxidation behavior is observed for the commercially available copper oxide below about 150° C. while complete conversion of CO to $CO_2$ was observed for the calcined copper oxide particles at about 150° C.

Figure 2:
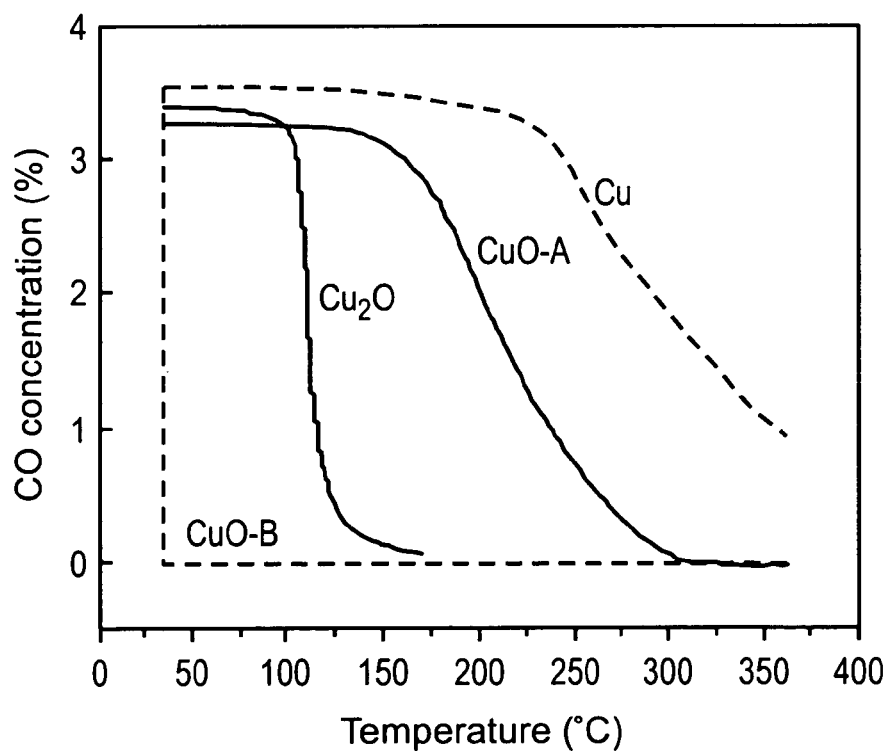
FIG. 2 shows a plot of carbon monoxide concentration versus temperature for activated particles of a copper oxide catalyst and comparative copper oxide and copper materials.

The effect of activation on copper oxide (and copper) catalysts is shown in FIG. 2, which shows CO oxidation curves for commercially available copper oxide (curve A), calcined copper oxide (curve B) prepared as above, commercially available copper oxide ($Cu_2O$) (curve C) and commercially available metallic copper (curve D). Each of the samples used to generate the data reported in FIG. 2 was activated prior to testing.

Referring to FIG. 2, complete oxidation of CO to $CO_2$ was observed for the activated copper oxide particles (curve B) at room temperature. Furthermore, these copper oxide particles maintained about 90% of their catalytic efficiency at room temperature after 24 hrs. of continuous exposure to the $CO/O_2$/Ar reactive gas mixture. The light off temperature and $T_{50}$ temperature for the activated catalysts is disclosed in Table 1.

TABLE 1

Light-off ($T_5$) and $T_{50}$ temperatures for activated catalysts

| Sample Curve | CuO<br>B | Commercial CuO (comparative)<br>A | Commercial $Cu_2O$ (comparative)<br>C | Commercial Cu (comparative)<br>D |
|---|---|---|---|---|
| $T_5$ (° C.) | 30 | 160 | 100 | 225 |
| $T_{50}$ (° C.) | 30 | 220 | 115 | 310 |

Figure 3:
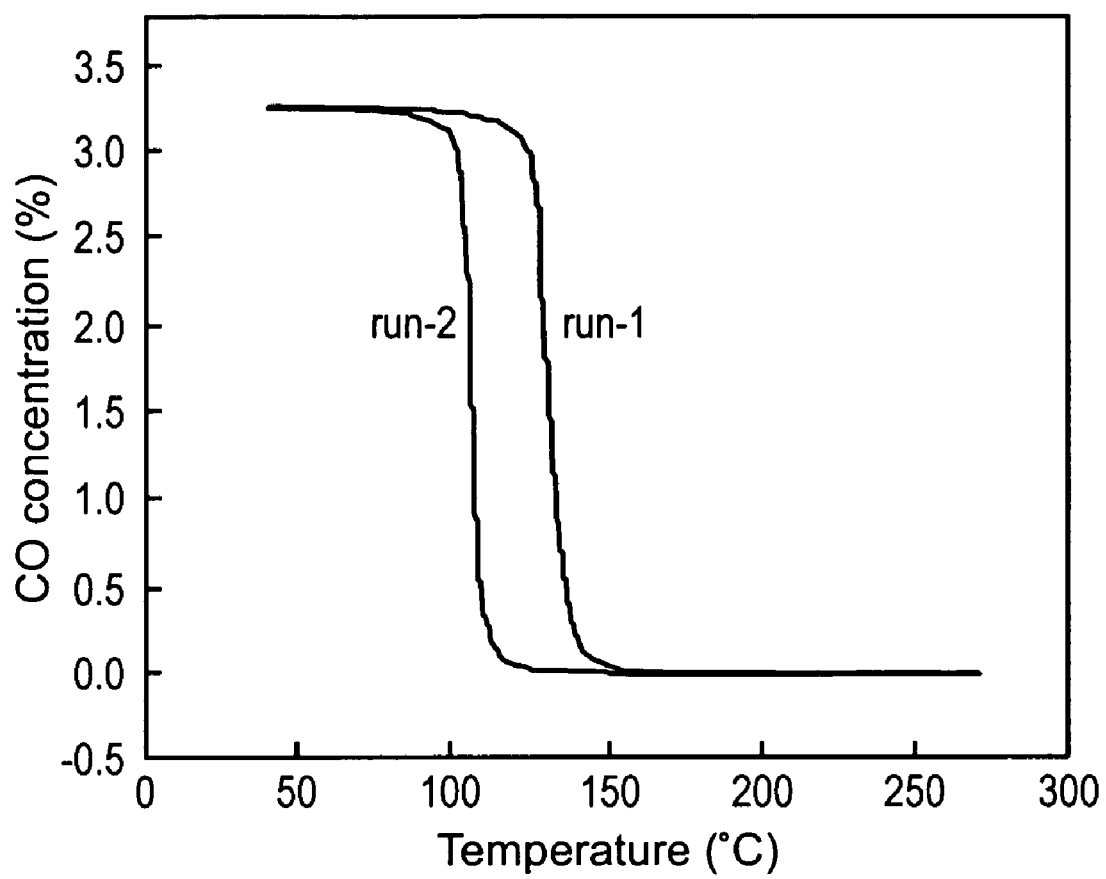
FIG. 3 shows a plot of carbon monoxide concentration versus temperature for comparative activated and unactivated copper oxide particles obtained from precipitated copper hydroxide after drying in an oven at 110° C. for 12 hours.

FIG. 3 shows CO oxidation curves for copper oxide particles that were prepared via precipitation of copper hydroxide, but wherein the copper hydroxide particles were dried in air at 110° C. for 12 hrs. prior to calcination. In FIG. 3, curve A corresponds to unactivated copper oxide particles and curve B corresponds to activated copper oxide particles.

Referring to FIG. 3, activation of the copper oxide particles improves their catalytic efficiency (e.g., with activation, $T_5$ decreases from about 125° C. to about 100° C., and $T_{50}$ decreases from about 130° C. to about 110° C.). However, in contrast to the activated copper oxide catalyst particles that were derived from precipitated copper hydroxide dried at near ambient temperature prior to calcining, neither sample derived from precipitated copper hydroxide that was dried at elevated temperature displays room temperature oxidation behavior.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A method of forming particles of a copper oxide carbon monoxide catalyst comprising:
    forming a precipitate of copper hydroxide from a copper salt solution;
    optionally filtering the precipitate;
    drying the copper hydroxide precipitate at a temperature of less than about 30° C. to form copper hydroxide particles;
    heating the copper hydroxide particles to form copper oxide particles; and
    activating the copper oxide particles in an atmosphere comprising oxygen and carbon monoxide,
    wherein the copper salt comprises copper nitrate, and
    wherein the copper hydroxide particles are heated in an oxidizing atmosphere at a temperature of between about 200° C. and 350° C.

2. The method of claim 1 wherein the copper hydroxide precipitate is formed by drop-wise addition of an aqueous solution of ammonia to an aqueous solution of copper nitrate.

3. The method of claim 1, wherein the copper hydroxide precipitate is formed at a pH of between about 6 and 9.

4. The method of claim 1, wherein the copper hydroxide precipitate is dried in air.

5. The method of claim 1, wherein the activating comprises heating the copper oxide particles in an atmosphere comprising oxygen and carbon monoxide at a temperature of about 100° C.

6. The method of claim 1, wherein the activating comprises heating the copper oxide particles in an atmosphere comprising 15 to 25% oxygen, 2 to 5% carbon monoxide and balance argon at a temperature of about 100° C.

7. A method of forming particles of a copper oxide carbon monoxide catalyst comprising:
    forming a precipitate of copper hydroxide from a copper salt solution;
    optionally filtering the precipitate;
    drying the copper hydroxide precipitate at a temperature of less than about 30° C. to form copper hydroxide particles;
    heating the copper hydroxide particles to form copper oxide particles; and
    activating the copper oxide particles in an atmosphere comprising oxygen and carbon monoxide,
    wherein the copper salt comprises copper nitrate, and
    wherein the copper hydroxide particles are heated in air at a temperature of between about 200° C. and 350° C. for at least about 2 hours.

8. The method of claim 7, wherein the copper hydroxide precipitate is formed by drop-wise addition of an aqueous solution of ammonia to an aqueous solution of copper nitrate.

9. The method of claim 7, wherein the copper hydroxide precipitate is formed at a pH of between about 6 and 9.

10. The method of claim 7, wherein the copper hydroxide precipitate is dried in air.

11. The method of claim 7, wherein the activating comprises heating the copper oxide particles in an atmosphere comprising oxygen and carbon monoxide at a temperature of about 100° C.

12. The method of claim 7, wherein the activating comprises heating the copper oxide particles in an atmosphere comprising 15 to 25% oxygen, 2 to 5% carbon monoxide and balance argon at a temperature of about 100° C.

13. A method of forming particles of a copper oxide carbon monoxide catalyst comprising:
    forming a precipitate of copper hydroxide from a copper salt solution;
    optionally filtering the precipitate;
    drying the copper hydroxide precipitate at a temperature of less than about 30° C. to form copper hydroxide particles;
    heating the copper hydroxide particles to form copper oxide particles; and
    activating the copper oxide particles in an atmosphere comprising oxygen and carbon monoxide,
    wherein the copper salt comprises copper nitrate, and
    wherein the copper hydroxide particles are heated in air at a temperature of about 250° C. for 2 hours.

14. The method of claim 13, wherein the copper hydroxide precipitate is formed by drop-wise addition of an aqueous solution of ammonia to an aqueous solution of copper nitrate.

15. The method of claim 13, wherein the copper hydroxide precipitate is formed at a pH of between about 6 and 9.

16. The method of claim 13, wherein the copper hydroxide precipitate is dried in air.

17. The method of claim 13, wherein the activating comprises heating the copper oxide particles in an atmosphere comprising oxygen and carbon monoxide at a temperature of about 100° C.

18. The method of claim 13, wherein the activating comprises heating the copper oxide particles in an atmosphere comprising 15 to 25% oxygen, 2 to 5% carbon monoxide and balance argon at a temperature of about 100° C.

* * * * *